(12) United States Patent
Kenion et al.

(10) Patent No.: US 11,891,480 B2
(45) Date of Patent: Feb. 6, 2024

(54) LAMINATING ADHESIVES USING POLYESTER FROM TRANSESTERIFICATION OF POLYLACTIC ACID WITH NATURAL OILS

(71) Applicant: Henkel AG & Co. KGaA, Duesseldorf (DE)

(72) Inventors: Grant B. Kenion, Easton, PA (US); Alexander P. Mgaya, Cary, NC (US); Zhengmian Chang, Belle Mead, NJ (US); Balasubramaniam Ramalingam, Cary, NC (US)

(73) Assignee: Henkel AG & Co. KGaA, Duesseldorf (DE)

( * ) Notice: Subject to any disclaimer, the term of this patent is extended or adjusted under 35 U.S.C. 154(b) by 731 days.

(21) Appl. No.: 17/019,617

(22) Filed: Sep. 14, 2020

(65) Prior Publication Data

US 2021/0002422 A1 Jan. 7, 2021

Related U.S. Application Data

(63) Continuation-in-part of application No. 16/374,350, filed on Apr. 3, 2019, now Pat. No. 10,941,246, and (Continued)

(51) Int. Cl.
*C08G 63/91* (2006.01)
*C08G 63/06* (2006.01)
(Continued)

(52) U.S. Cl.
CPC ........... *C08G 63/912* (2013.01); *C08G 63/06* (2013.01); *C08G 63/08* (2013.01); *C08G 63/60* (2013.01);
(Continued)

(58) Field of Classification Search
CPC .............................. C08G 63/912; C08G 63/08
See application file for complete search history.

(56) References Cited

U.S. PATENT DOCUMENTS 6,664,363 B1 12/2003 Faunce
8,242,197 B2 8/2012 Warth et al.
(Continued)

FOREIGN PATENT DOCUMENTS

CN 101104680 A 1/2008
CN 101851326 A 10/2010
(Continued)

OTHER PUBLICATIONS

Rasal, Rahul M. et al., "Poly(lactic acid) modifications." Progress in Polymer Science, 35 (Mar. 2010), pp. 338-356.
(Continued)

*Primary Examiner* — Michael M Dollinger
(74) *Attorney, Agent, or Firm* — James E. Piotrowski

(57) ABSTRACT

A specific mixture of polyols, at least one of which contains the transesterification product of the polymer polylactic acid with natural oils. The mixture of polyols can be used as one component of a two-component adhesive for laminating flexible packaging. The other component comprises an isocyanate-functionalized compound. The two components are combined before use and the resulting adhesive can be used to bond films to form a flexible packaging material.

16 Claims, 1 Drawing Sheet

Related U.S. Application Data a continuation of application No. PCT/US2019/024478, filed on Mar. 28, 2019, said application No. 16/374,350 is a continuation of application No. 16/043,521, filed on Jul. 24, 2018, now Pat. No. 10,294,328.

(60) Provisional application No. 62/653,795, filed on Apr. 6, 2018, provisional application No. 62/289,432, filed on Feb. 1, 2016.

(51) Int. Cl.
*C08G 63/60* (2006.01)
*C08G 63/08* (2006.01)
*C08G 63/85* (2006.01)
*B01J 31/02* (2006.01)
*B01J 31/00* (2006.01)

(52) U.S. Cl.
CPC ............... *C08G 63/85* (2013.01); *B01J 31/00* (2013.01); *B01J 31/0212* (2013.01); *B01J 2231/49* (2013.01)

(56) References Cited

U.S. PATENT DOCUMENTS

| | | |
|---|---|---|
| 9,290,613 B2 | 3/2016 | Uyama et al. |
| 9,580,538 B2 | 2/2017 | Kollbach et al. |
| 10,294,328 B2 | 5/2019 | Kenion |
| 2007/0036855 A1 | 2/2007 | Domb et al. |
| 2009/0209727 A1 | 8/2009 | Barbier et al. |
| 2011/0275749 A1 | 11/2011 | Uyama et al. |
| 2012/0264905 A1 | 10/2012 | Shimura et al. |
| 2013/0065046 A1 | 3/2013 | Krishnaswamy et al. |
| 2013/0236499 A1* | 9/2013 | Andjelic ............... C08G 63/08 528/355 |
| 2015/0159062 A1 | 6/2015 | Giorgini |
| 2015/0217028 A1 | 8/2015 | Pacetti et al. |
| 2017/0002240 A1 | 1/2017 | Ostlund et al. |
| 2018/0327545 A1 | 11/2018 | Kenion et al. |

FOREIGN PATENT DOCUMENTS

| | | |
|---|---|---|
| CN | 102850743 A | 1/2013 |
| CN | 103180403 A | 6/2013 |
| CN | 103687920 A | 3/2014 |
| CN | 102282194 B | 2/2015 |
| CN | 104448270 A | 3/2015 |
| JP | 2005089712 A | 4/2005 |
| JP | 2006143829 A | 6/2006 |
| JP | 2018051796 A | 4/2018 |
| WO | 2017003872 A1 | 1/2017 |
| WO | 2017136373 A1 | 8/2017 |

OTHER PUBLICATIONS

Noureddini, H. and Zhu, D. "Kinetics of Transesterification of Soybean Oil." JAOCS, vol. 74, No. 11 (1997), pp. 1457-1463.
Soedergård, A. and Stolt, M. "Properties of lactic acid based polymers and their correlation with composition." Prog. Polym. Sci. 27 (2002) pp. 1123-1163.
Makromol. Chem. 190, (1989), pp. 2407-2415.
Coullerez, G. et al., "Synthesis of acrylate functional telechelic poly(lactic acid) oligomer by transesterification," Journal of Materials Science: Materials in Medicine, 11 (2000), pp. 505-510.
Sadik, T et al., "In-melt transesterification of poly(lactic acid) and poly(ethylene-co-vinylalcohol)," Materials Chemistry and Physics 140 (2013) pp. 559-569.
Konda et al., "Castor Oil-Based Biodegradable Polyesters," Biomacromolecules, vol. 16, No. 9, 2015, pp. 2572-2587.
International Search Report for International PCT Patent Application No. PCT/US2019/024478 dated Jul. 7, 2019.
International Search Report for International PCT Patent Application No. PCT/US2017/015927 dated May 25, 2017.

* cited by examiner

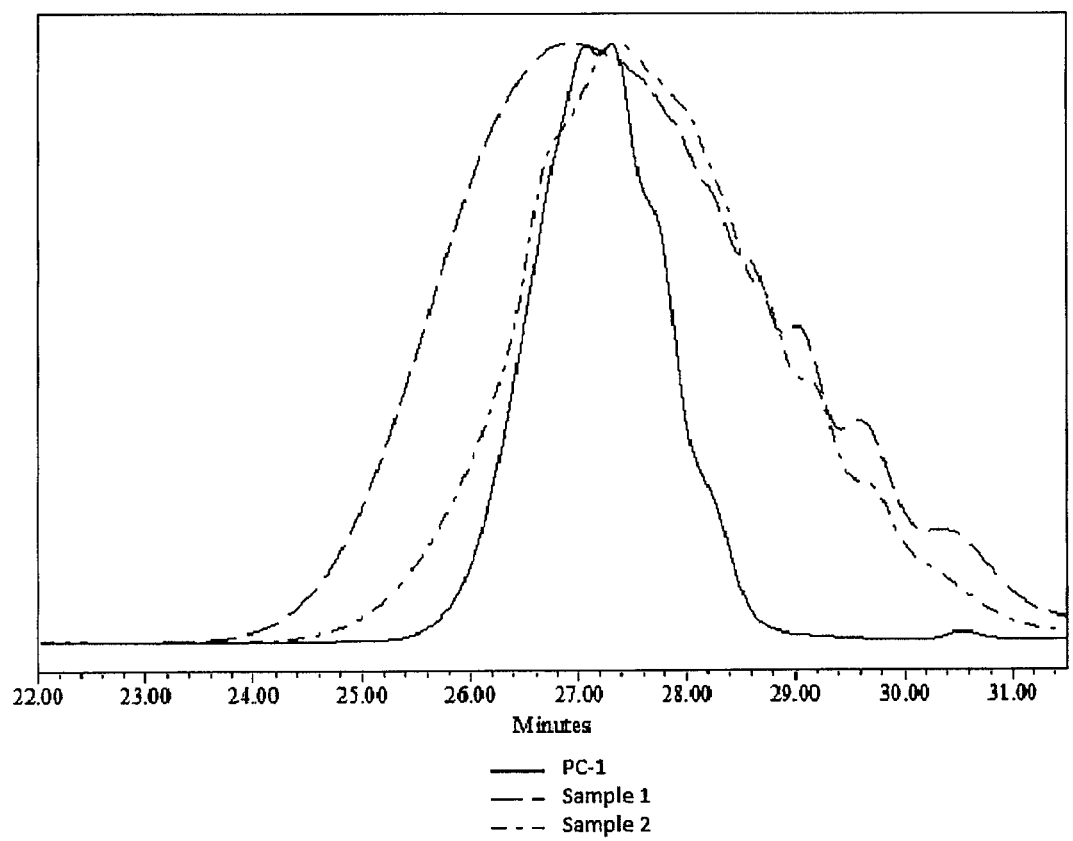

LAMINATING ADHESIVES USING POLYESTER FROM TRANSESTERIFICATION OF POLYLACTIC ACID WITH NATURAL OILS

FIELD

Disclosed are two component laminating adhesives in which a first component comprises an isocyanate-functionalized compound such as NCO-terminated polyurethane prepolymer and a second component comprises an isocyanate reactive mixture of polyols, at least one of which contains the transesterification product of the polymer polylactic acid with natural oils. The two components are combined and the resulting adhesive can be used to form a flexible packaging material.

BACKGROUND

Product packaging has been changing from sealed metal cans and glass bottles to sealed flexible packages such as pouches. As one example tuna fish is now available in both traditional metal cans and flexible pouches. The flexible package when filled with a food or other product and closed or sealed can be readily changed in shape by user manipulation. The flexible package is typically prepared from two layers of flexible packaging material that are overlaid and sealed around most of their periphery to form a cavity inside. Typically, the two layers of flexible packaging material are heat sealed by applying heat and pressure to fuse the layers together around a thin portion of the package periphery. Food or other product is placed in the cavity through an opening and the opening is closed by heat sealing the opening layers together. The sealed package and enclosed product can be heated for preservation purposes. In some demanding applications the sealed package and enclosed product can be retorted, that is heated to temperatures of 100° C. or more.

Flexible packaging material is prepared by laminating two or more layers of film. Each film is chosen for specific properties. For example, a flexible packaging material can be a lamination of three layers. The inner layer will contact the packaged product. Polypropylene has desirable product contact properties as well as heat sealability and can be used as an inner layer. An optional middle layer can be used to provide a barrier to moisture, oxygen and/or light. Metal films or foils have desirable barrier properties and metal films such as aluminum foil can be used as a middle layer. The outer layer will provide protection for the package and also provides a surface for printing information such as contents, packaging date, warnings, etc. Polyester films are tough, can receive printing ink and can be used as an outer layer. Flexible packaging material can range in thickness from about 13 to about 75 micrometers (0.0005 inches to 0.003 inches).

Each layer of the flexible packaging material is bonded to the adjacent layer by an adhesive. Adhesive can be applied to the layer from a solution in a suitable solvent using gravure or smooth roll coating cylinders or from a solvent-free state using special application machinery and that layer is laminated to the adjacent layer. The laminated packaging material is dried if necessary and accumulated in rolls.

Although there are many possible types of adhesives, polyurethane based adhesives are preferred for use in flexible packaging materials because of their many desirable properties including good adhesion to the materials in each layer, high peel strength, resistance to heat such as from heat sealing or retorting, and resistance to food products. Typically, a two-component polyurethane adhesive is used. The first component is an isocyanate moiety containing (isocyanate functional) polyurethane prepolymer obtained by the reaction of excess diisocyanate with a polyether and/or polyester containing two or more active hydrogen groups per molecule. The second component is usually a polyol. The two components are combined just before use to initiate a cure reaction between the components and applied to the film surfaces to be laminated.

Solvent is used as a diluent for some polyurethane laminating adhesives as the viscosity of those mixed adhesives is too high to apply them reliably in liquid form in a roll to roll laminating process. Solvent- or water-based laminating adhesives are limited to an application speed at which the solvent or water can be effectively removed in an oven. Typical line speeds for solvent-based and water-based laminating adhesives are 300 to 600 feet per minute due to the drying restrictions. Solventless laminating adhesives (adhesives that can be applied at 100% solids and that do not contain either organic solvents or water) have a distinct advantage in that they can be applied and run at very high line speeds as there is no solvent or water that must be removed from the adhesive in a drying step. Typical line speeds for solventless adhesives are 900 to even 2000 feet per minute, a line speed not possible with solvent-based and water-based laminating adhesives. Solventless laminating adhesives thus have a distinct advantage over solvent-based or water-borne adhesives.

Some solventless polyurethane laminating adhesives must be heated to 100° C. to achieve a viscosity suitable for use in laminating packaging material. These high temperatures are difficult to achieve and control and are not energy efficient. In order to bring application temperature down, molecular weight of the first component polyurethane prepolymers can be lowered, but the missing molecular weight must be recovered by adding another component to the adhesive mixture, generally a blend of polyols. The application temperature for these modified polyurethane laminating adhesives can be reduced to about 40° C.

The cured adhesive must provide suitable peel strength to prevent delamination and contain the food products, both at room temperature and the elevated temperatures encountered during food packaging, processing and serving. The cured adhesive properties must also unaffected by contact with food products.

There are numerous regulations governing use of flexible packaging material in food packaging applications. Naturally, regulations require that the food packaging be safe when in contact with food. Migration of adhesive constituents, such as unreacted isocyanate monomers into the food product is a concern. Excess isocyanates in a laminating adhesive can react with moisture in packaged products to form primary aromatic amines. The U.S. FDA requires that the concentration of primary aromatic amines in a flexible packaging material used for food contact be below the detection limit (2 parts per billion (ppb) when tested by the migration test, also referred to as the BfR test method). One solution is to keep the flexible packaging material in storage until the adhesive components are fully reacted. After the adhesive components are fully reacted the flexible packaging material is formed into pouches. Unfortunately, in case of laminating adhesives using lower molecular weight prepolymers and polyols this could take a long time, up to a couple of weeks, and involve storage of large amounts of expensive laminating material before it can be used.

It is also desirable to use naturally derived materials. This is advantageous to lessen concerns about sustainability and also to eliminate dependence on petroleum derived materials. Polylactic acid (PLA) is one naturally derived material available as a reasonably priced, technical grade. PLA is currently used for bags and films. Medical grades have been used extensively for use in medical applications requiring biocompatibility and long-term biodegradability. However, current PLA films are not suitable for use in food packaging applications as they lack acceptable strength, elongation and food resistance properties.

U.S. Patent Publication Number 2017/0002240 discloses one attempt at a laminating adhesive incorporating naturally derived materials. However, this disclosure mentions usage only with OPP/OPP and PET/PE laminates and makes no mention of adhesion to other commercially important substrates. This disclosure also fails to mention other important properties for a laminating adhesive such as heat seal strength. In addition, the polyol blend disclosed therein can phase separate during storage and the cured adhesive may not have sufficient resistance to many food products for use in some food packaging applications.

Similarly, U.S. Patent Publication Number 2015/019635 discloses use of polylactic acid reaction products as an ingredient in an OH component blend for a pressure sensitive adhesive. Performance of the disclosed adhesive is not suitable for use as a laminating adhesive in flexible food packaging.

It would be desirable to provide a laminating adhesive comprising naturally derived materials.

It would also be desirable to provide a laminating adhesive comprising naturally derived materials wherein the cured adhesive can provide suitable bond strength to contain the food products, both at room temperature and the elevated temperatures. The cured adhesive properties must also have improved bond strength after contact with food products.

It would also be desirable to provide a laminating adhesive comprising naturally derived materials wherein the cured adhesive improved bond strength after contact with food products.

SUMMARY

The present disclosure provides a two-component laminating adhesive comprising Component A and Component B. Component A comprises an isocyanate-functionalized compound. Component B comprises a specific mixture of polyols, at least one of which contains the transesterification product of the polymer polylactic acid with a natural oil.

In one embodiment Component B comprises a specific mixture of polyols, at least one of which contains the transesterification product of the polymer polylactic acid with a diol and a natural oil.

The disclosed component B comprising the transesterification product allows users to enhance sustainability at a cost comparable to petroleum based laminating adhesives. It also provides, in combination with the right isocyanate component, the heat resistance, product resistance, and bond strength desirable for production of a flexible packaging for food.

In one embodiment a flexible packaging material is formed by combining and mixing Components A and B to form a laminating adhesive. The mixed adhesive is disposed onto selected films using known equipment and the films are laminated and the adhesive is cured to form flexible packaging material.

The disclosed compounds include any and all isomers and stereoisomers. In general, the disclosed compositions may be alternately formulated to comprise, consist of, or consist essentially of, any appropriate components herein disclosed. The disclosed compositions may additionally, or alternatively, be formulated so as to be devoid, or substantially free, of any components, materials, ingredients, adjuvants or species used in the prior art compositions or that are otherwise not necessary to the achievement of the disclosed function and/or objectives.

The word "about" or "approximately" as used herein in connection with a numerical value refer to the numerical value ±10%, preferably ±5% and more preferably ±1% or less.

BRIEF DESCRIPTION OF THE DRAWING

FIG. 1 is GPC chromatogram comparing two transesterified polyester polyol reaction products and a comparative polyol reaction product.

DETAILED DESCRIPTION

As used herein percentages are by weight unless otherwise specifically described. As used herein molecular weight refers to number average molecular weight ($M_n$) unless otherwise specifically described. As used herein mg means milligrams, g means grams; mol means mole; mmol means millimoles; ml means milliliters, L means liter; ga means gauge. The term "OH number" means the hydroxyl value of a polymer and is defined as the number of milligrams of potassium hydroxide required to neutralize the acetic acid taken up on acetylation of one gram of a tested polymer that contains free hydroxyl groups. Room temperature is 20 to 25° C. at ambient indoor humidity.

The disclosed flexible packaging adhesive in ready to use form comprises a substantially homogeneous mixture of Component A and Component B. Components A and B are stored separately and mixed in a predetermined ratio just before use. Mixing the components initiates a relatively quick reaction between the isocyanate groups in Component A and the OH groups of the polyols in Component B.

Component A

Component A contains at least one compound having two or more terminal isocyanate groups per molecule. The isocyanate groups are typically free —NCO groups, but can also be blocked or masked —NCO groups. In one embodiment Component A is prepared using one or more polyisocyanates. Prepared from indicates Component A can comprise the one or more polyisocyanates or can comprise the reaction product of one or more polyisocyanates or can comprise both. One embodiment of Component A employs one or more isocyanate-functionalized polyurethane prepolymers. In the context of this disclosure a polyurethane prepolymer is a compound such as results, for example, from the reaction of a polyol component (or other active hydrogen-functionalized compound) with at least one polyisocyanate having a functionality of at least two. The term "polyurethane prepolymer" embraces not only compounds having a relatively low molecular weight, such as are formed, for example, from the reaction of a polyol with an excess of polyisocyanate, but also oligomeric or polymeric compounds. Likewise embraced by the term "polyurethane prepolymers" are compounds formed, for example, from the reaction of a trivalent or tetravalent polyol with a molar excess of polyisocyanate, relative to the polyol.

Excess unreacted polyisocyanate monomer may optionally be removed from the polyurethane prepolymer reaction product initially obtained by any known method such as, for example, distillation to provide a prepolymer having a desirably low level of polyisocyanate monomer (e.g., less than 1 weight %).

Polyurethane prepolymers are customarily prepared by reacting at least one polyisocyanate, preferably a diisocyanate, and at least one component having a plurality of functional groups which are reactive toward isocyanate groups, generally a polyol component. Molecular weight can be controlled at least approximately by way of the ratio of OH groups to isocyanate groups.

The polyol component used to prepare the polyurethane prepolymer may contain only one polyol, although it is also possible to use a mixture of two or more polyols as the polyol component. By a polyol is meant a polyfunctional alcohol, i.e., a compound having more than one OH group in the molecule. These are, for example, aliphatic alcohols having from 2 to 4 OH groups per molecule. The OH groups may be primary or secondary. Examples of suitable aliphatic alcohols include ethylene glycol, propylene glycol, butane-1,4-diol, pentane-1,5-diol, hexane-1,6-diol, heptane-1,7-diol, octane-1,8-diol and their higher homologs or isomers such as result in a formal sense from a stepwise extension of the hydrocarbon chain by one $CH_2$ group in each case or with the introduction of branches into the carbon chain. Likewise, suitable are higher polyfunctional alcohols such as, for example, glycerol, trimethylolpropane, pentaerythritol and oligomeric ethers of said substances with themselves or in a mixture of two or more of said ethers with one another.

As the polyol component it is additionally possible to use reaction products of low molecular weight polyfunctional alcohols with alkylene oxides, referred to as polyether polyols. The alkylene oxides have preferably 2 to 4 carbon atoms. Suitable examples are the reaction products of ethylene glycol, propylene glycol, the isomeric butanediols, hexanediols or 4,4'-dihydroxy-diphenylpropane with ethylene oxide, propylene oxide or butylene oxide, or with mixtures of two or more thereof. Also suitable, furthermore, are the reaction products of polyfunctional alcohols, such as glycerol, trimethylolethane or trimethylolpropane, pentaerythritol, sugars or sugar alcohols, or mixtures of two or more thereof, with the stated alkylene oxides to form polyether polyols. Particularly suitable polyether polyols are those having a molecular weight from about 100 to about 10,000, preferably from about 200 to about 5,000. Likewise, suitable as the polyol component are polyether polyols such as are formed, for example, from the polymerization of tetrahydrofuran.

The polyether polyols may be synthesized using methods known to the skilled worker, by reaction of the starting compound having a reactive hydrogen atom with alkylene oxides: for example, ethylene oxide, propylene oxide, butylene oxide, styrene oxide, tetrahydrofuran or epichlorohydrin or mixtures of two or more thereof. Examples of suitable starting compounds are water, ethylene glycol, propylene 1,2-glycol or 1,3-glycol, butylene 1,4-glycol or 1,3-glycol, hexane-1,6-diol, octane-1,8-diol, neopentylglycol, 1,4-hydroxymethylcyclohexane, 2-methyl-1,3-propanediol, glycerol, trimethylolpropane, hexane-1,2,6-triol, butane-1,2,4-triol, trimethylolethane, pentaerythritol, mannitol, sorbitol, methylglycosides, sugars, phenol, isononylphenol, resorcinol, hydroquinone, 1,2,2- or 1,1,2-tris(hydroxyphenyl)ethane, ammonia, methylamine, ethylenediamine, tetra- or hexamethyleneamine, triethanolamine, aniline, phenylenediamine, 2,4- and 2,6-diaminotoluene and polyphenylpolymethylene-polyamines (such as are obtainable by aniline-formaldehyde condensation), or mixtures of two or more thereof.

Likewise, suitable for use as the polyol component are polyether polyols which have been modified by vinyl polymers. Products of this kind are available, for example, by polymerizing styrene or acrylonitrile, or a mixture thereof, in the presence of polyether polyols.

Polyester polyols having a molecular weight of from about 200 to about 10,000 are likewise suitable as the polyol component. Thus, for example, it is possible to use polyester polyols formed by reacting low molecular weight alcohols, especially ethylene glycol, diethylene glycol, neopentyl glycol, hexanediol, butanediol, propylene glycol, glycerol or trimethylolpropane, with caprolactone. Likewise, suitable as polyfunctional alcohols for preparing polyester polyols are 1,4-hydroxymethylcyclohexane, 2-methyl-1,3-propanediol, butane-1,2,4-triol, triethylene glycol, tetraethylene glycol, polyethylene glycol, dipropylene glycol, polypropylene glycol, dibutylene glycol and polybutylene glycol.

Further suitable polyester polyols are preparable by polycondensation. For instance, difunctional and/or trifunctional alcohols can be condensed with a substoichiometric amount of dicarboxylic acids and/or tricarboxylic acids, or their reactive derivatives, to form polyester polyols. Examples of suitable dicarboxylic acids are adipic acid or succinic acid and their higher homologs having up to 16 carbon atoms, unsaturated dicarboxylic acids such as maleic acid or fumaric acid, and aromatic dicarboxylic acids, particularly the isomeric phthalic acids, such as phthalic acid, isophthalic acid or terephthalic acid. Examples of suitable tricarboxylic acids are citric acid or trimellitic acid. These acids may be used individually or as mixtures of two or more thereof. Particularly suitable in the context of this disclosure are polyester polyols formed from at least one of said dicarboxylic acids and glycerol which have a residual OH group content. Particularly suitable alcohols are hexanediol, ethylene glycol, diethylene glycol or neopentyl glycol or mixtures of two or more thereof. Particularly suitable acids are isophthalic acid or adipic acid or their mixtures.

Polyester polyols of high molecular weight include, for example, the reaction products of polyfunctional alcohols, preferably difunctional alcohols (together where appropriate with small amounts of trifunctional alcohols) and polyfunctional carboxylic acids, preferably difunctional carboxylic acids. Instead of free polycarboxylic acids use may also be made (if possible) of the corresponding polycarboxylic anhydrides or corresponding polycarboxylic esters with alcohols having preferably 1 to 3 carbon atoms. The polycarboxylic acids may be aliphatic, cycloaliphatic, aromatic or heterocyclic or both. They may where appropriate be substituted, by alkyl groups, alkenyl groups, ether groups or halogens, for example. Examples of suitable polycarboxylic acids include succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acid or trimer fatty acid or mixtures of two or more thereof. Where appropriate, minor amounts of monofunctional fatty acids may be present in the reaction mixture.

The polyester polyols may, where appropriate, contain a small fraction of carboxyl end groups. Polyester polyols obtainable from lactones, ε-caprolactone for example, or hydroxycarboxylic acids, ω-hydroxycaproic acid for example, may likewise be used.

Polyacetals and polyester ether polyols are likewise suitable as the polyol component. By polyacetals are meant compounds obtainable from glycols reacted with aldehydes, for example, diethylene glycol or hexanediol or a mixture thereof condensed with formaldehyde. Polyacetals which can be used in the context of the disclosure may likewise be obtained by the polymerization of cyclic acetals.

Further suitable polyols include polycarbonates. Polycarbonates can be obtained, for example, by reacting diols, such as propylene glycol, butane-1,4-diol or hexan-1,6-diol, diethylene glycol, triethylene glycol or tetraethylene glycol, or mixtures of two or more thereof, with diaryl carbonates, for example, diphenyl carbonate, or phosgene.

Polyisocyanates which can be used in component A are not limited and include compounds having two or more reactive isocyanate groups or mixtures of compounds having an average of two or more reactive isocyanate groups.

Some useful polyisocyanates include, for example, of 1,5-naphthylene diisocyanate, diphenylmethane diisocyanate (MDI), hydrogenated MDI ($H_{12}$MDI), xylylene diisocyanate (XDI), tetramethylxylylene diisocyanate (TMXDI), 4,4'-diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenylperfluoroethane, tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, bisisocyanatoethyl phthalate and also diisocyanates having reactive halogen atoms, such as 1-chloromethylphenyl 2,4-diisocyanate, 1-bromomethylphenyl 2,6-diisocyanate, 3,3-bischloromethyl ether 4,4'-diphenyl diisocyanate.

Diphenylmethane diisocyanate (MDI) is available in three isomers, 4,4'-diphenylmethane diisocyanate (4,4'-MDI), 2,4-diphenylmethane diisocyanate (2,4'-MDI), and 2,2'-diphenylmethane diisocyanate (2,2'-MDI). Mixtures of two or more of these isomers can be used for some or all of the polyisocyanate. Alternatively, one or more of these isomers can be excluded.

Modified versions of diphenylmethane diisocyanate can be used for some or all of the polyisocyanate. Examples of useful modified MDIs include e.g., carbodiimide-modified diphenylmethane diisocyanate (carbodiimide-modified MDI), allophanate-modified diphenylmethane diisocyanate (allophanate-modified MDI), biuret-modified diphenylmethane diisocyanate (biuret-modified MDI), polymeric MDI and combinations thereof.

Component A preferably is formulated to have an isocyanate functionality of 2 or greater. Use of a component A having an isocyanate functionality of less than 2 is not likely to provide a laminating adhesive having desired properties.

Component A preferably is formulated to have a viscosity of not greater than about 10,000 cps (more preferably, not greater than about 5000 cps; most preferably, not greater than about 3500 cps) at 25 degrees C. and a viscosity of not greater than about 2500 cps (more preferably, not greater than about 2000 cps) at 60 degrees C. The polyurethane prepolymers used in component A generally may have a molecular weight of from 500 to 27,000, alternatively from 700 to 15,000, or alternatively from 700 to 8,000 g/mol.

Component B

Component B comprises the transesterification product of the polymer polylactic acid with a natural oil. In some embodiments Component B comprises a mixture of polyols including the transesterification product of the polymer polylactic acid with a natural oil and a different polyol. In some embodiments Component B comprises a mixture of polyols including the transesterification product of the polymer polylactic acid with a natural oil, a different polyol and a high OH functionality polyol product.

Transesterification processes are known in the art for a variety of reactive components. In the overall transesterification reaction an alcohol is reacted with an ester in the presence of a catalyst and one R group on the ester is exchanged for the R group on the alcohol: R'—OH+R"—O—C(O)—R→R"—OH+R'—O—C(O)—R. The transesterified polylactic acid polymers have desirable improved properties compared to polylactic acid such as: a liquid or waxy solid state at room temperature and improved solubility in a variety of solvents.

The following is a general description of the transesterification process useful herein. A high molecular weight polylactic acid polymer and optionally a diol and/or a transesterification catalyst are combined to form a reaction mixture and this reaction mixture is heated to a temperature below the degradation temperature of the reaction mixture components to form a molten reaction mixture. At least one natural oil is added to the molten reaction. Initially, the combination of the molten reaction mixture and the natural oil forms a dual layered mixture. The components are mixed at an elevated temperature until substantially homogeneous. The temperature of the substantially homogeneous mixture is increased to a temperature high enough for transesterification to proceed. The substantially homogeneous reaction mixture is maintained at or above this temperature until transesterification is completed to the desired extent. Once transesterification is completed to the desired extent the reaction mixture is cooled to a convenient temperature for handling and the transesterified polylactic acid reaction product is collected. Generally, the transesterification process is conducted until the reaction mixture forms a clear, homogeneous and single layered product.

The transesterification process breaks down the high molecular weight polylactic acid polymer into much lower molecular weight PLA oligomers; breaks down the natural oil into lower molecular weight constituent fatty acids and glycerol; and randomly reacts and combines these lower molecular weight components to form a plurality of PLA polyols. The fatty acids derived from the natural oil are found as pendent chains attached to the transesterified polylactic acid product. The diol and released glycerol are found at the terminal ends of transesterified polylactic acid product or they join the smaller polylactic acid oligomers together. The optional diol allows adjustment of the OH number and molecular weight of the transesterified polylactic acid product. Further details of the transesterification process can be found in International Publication Number WO 2017/136373, the contents of which are included by reference herein.

The number average molecular weight of the high molecular weight polylactic acid polymer is not particularly limited and preferably comprises a polylactic acid having a number average molecular weight of from 2,000 to 200,000, preferably from 10,000 to 100,000 and more preferably about 60,000 to 100,000.

A natural oil means one derived from nature. Useful natural oils include, for example: soybean oil, castor oil, canola oil, sunflower oil, safflower oil, corn oil, peanut oil, almond oil, olive oil, coconut oil, palm oil, tall oil and mixtures thereof.

The optional diol is any structure including two reactive hydroxyl groups and a molecular weight of about 50 to about 2000 daltons. The optional diol is typically not a natural oil. Useful optional diols for the present reaction include diethylene glycol, polypropylene glycol having a molecular weight of from 400 to 2000 daltons, polyethylene glycol having a molecular weight of from 400 to 2000 daltons, neopentyl glycol, propylene glycol, dipropylene glycol, hexane diol, ethylene glycol, 2-methyl-1,3propanediol, butane diol, and polytetrahydrofuran. The extra hydroxyl group when a glycerol joins two polylactic acid chains can also be the site of a transesterification reaction. Use of an appropriate amount of diol will result in an OH terminated distribution of the polyester with the glycerol and fatty acids incorporated into the polylactic acid polymer. The pendent fatty acids lower the viscosity of the resulting polylactic acid polymer while the polylactic acid backbone provides stiffness.

The transesterification catalyst may be selected from a variety of catalysts including: phosphoric acid and esters thereof, sulfonic acids such as p-toluenesulfonic acid; and sulfuric acid. In addition, base catalyzed reactions can be conducted using as the catalyst alkaline metal alkoxides, for example sodium methoxide ($CH_3ONa$); alkaline metal hydroxides, for example KOH or NaOH; or dibutyltin dilaurate; or tin octoate. In some embodiments no transesterification catalyst is used. The preferred transesterification catalyst is a titanium alkoxide, for example titanium (IV) butoxide.

Preferably the transesterified polylactic acid component B product has a hydroxyl number of from 80 to 200 mg KOH/gram, more preferably from 115 to 145 mg KOH/gram and even more preferably from 120 to 140 mg KOH/gram.

Component B can optionally comprise a polyol different from the transesterification product of the polymer polylactic acid with a natural oil. The optional polyol can be a polyether polyol or a polyester polyol. The optional polyol may be, but is typically not derived from a natural oil.

Component B can optionally comprise a high OH functionality polyol product. High OH functionality polyol products are described in U.S. Patent Publication No. 2006/0105188 to Simons, the contents of which are incorporated by reference. High OH functionality products contain an average of two or more primary hydroxyl groups and preferably also contain an average of two or more secondary hydroxyl groups. The high OH functionality polyol product is obtained by a two step process comprising reacting a first polyol containing predominately secondary hydroxyl groups with a stoichiometric excess of a reactant selected from the group consisting of polybasic acids, polybasic acid anhydrides, polybasic acid esters, and polyisocyanates to form an intermediate containing at least about two terminal functional groups per molecule selected from the group consisting of isocyanate, carboxylic acid and carboxylic acid ester. The intermediate is reacted with a stoichiometric excess of a second polyol containing predominately primary hydroxyl groups to form the high OH functionality polyol product. Reaction of these components in a single step will not provide an acceptable high OH functionality polyol product for use in a laminating adhesive.

Preferably the weight percentage of component B derived from the transesterification product of the polymer polylactic acid with a natural oil ranges from 50 to 85 weight % based on total Component B weight, more preferably from 50 to 80 weight %. Preferably the weight percentage of component B product derived from natural oil in the final product ranges from 13 to 30 weight % based on the total Component B weight. When the optional diol is used the weight percent of component B product derived from that optional diol in the final product ranges from 2 to 36 weight % based on the total Component B weight. Different diols, if present, can be used in the range of 0 to 50 weight % based on the total Component B weight. As used herein the renewable content of a component is the weight percent of that component derived from natural sources. The renewable content of component B product is in the range of at least 70%. Component B preferably has a viscosity of 3,000 to 20,000 cps at 25° C. and more preferably 5,000 to 18,000 cps at 25° C. Component B preferably has a viscosity of about 2700 cps at 40° C. and 1100 cps at 50° C.

The amounts of Component A and Component B used in laminating adhesive systems will generally be adjusted so as to provide an NCO: active hydrogen (OH) equivalents ratio in the range of from about 1:1 to 10:1 in one embodiment of the invention and from about 1.05:1 to about 5:1 in another embodiment. Typically, the free isocyanate content (prior to any reaction between Component A and Component B) will be from about 1% to about 25% by weight based on the total weight of the two components adhesive. The weight ratio of Component A to Component B may vary within wide limits, with the optimum ratio being dependent upon the composition of each of Component A and Component B.

The mixture of Component A and Component B when first combined will have a viscosity of about 600 cps to about 2500 cps (more preferably, about 800 to about 1500 cps at application temperature. Mixed adhesive viscosities above 5,000 cps at application temperature are difficult or impossible to run on conventional solvent free laminating equipment. Typical application temperatures for flexible packaging lamination are about 40° C., although higher or lower application temperatures may be useful in some applications.

Typically, the mixed adhesive will have a pot-life of at least about 15 minutes and more preferably at least about 30 minutes. Pot life is the time it takes for the viscosity of the mixed adhesive to increase to double from the initial viscosity after Component A and Component B are mixed and held at a temperature of 40° C.

Where appropriate, in addition to Component A and Component B, the two-component laminating adhesive may optionally comprise one or more further additives conventionally used in flexible packaging laminating adhesives. The additives may, for example, account for up to about 10% by weight of the overall two component adhesive. The additives may be in either of Components A and B. The optional additives which can be used in the context of the present disclosure include solvents, water, catalysts, curing agents, accelerators, plasticizers, stabilizers, antioxidants, light stabilizers, fillers, dyes, pigments, fragrances, preservatives or mixtures thereof. Components A and/or B can also be free of any or all of these additives.

The film or films to be coated and adhered to each other using the two component adhesive formulations may be comprised of any of the materials known in the art to be suitable for use in flexible packaging laminate, including both polymeric and metallic materials as well as paper (including treated or coated paper). Thermoplastic polymers are particularly preferred for use as at least one of the layers. The materials chosen for individual layers in a flexible packaging laminate can be the same but are typically different materials selected to achieve specific desired combinations of properties, e.g., mechanical strength, tear resistance, elongation, puncture resistance, flexibility/stiffness, gas and water vapor permeability, oil and grease permeability, heat sealability, adhesiveness, optical properties (e.g., clear, translucent, opaque), formability, merchantability and relative cost. Individual layers may be pure polymers or blends of different polymers. The polymeric layers are often formulated with colorants, anti-slip, anti-block, and anti-static processing aids, plasticizers, lubricants, fillers, stabilizers and the like to enhance certain layer characteristics.

Particularly preferred polymers for use as layers include, but are not limited to, polyethylene (including low density polyethylene (LDPE), medium density polyethylene (MDPE), high density polyethylene (HPDE), high molecular weight, high density polyethylene (HMW-HDPE), linear low density polyethylene (LLDPE), linear medium density polyethylene (LMPE)), polypropylene (PP), oriented polypropylene, polyesters such as poly (ethylene terephthalate) (PET) and poly (butylene terephthalate) (PBT), ethylene-vinyl acetate copolymers (EVA), ethylene-acrylic acid copolymers (EAA), ethylene-methyl methacrylate copolymers (EMA), ethylene-methacrylic acid salts (ionomers), hydrolyzed ethylene-vinyl acetate copolymers (EVOH), polyamides (nylon), polyvinyl chloride (PVC), poly(vinylidene chloride) copolymers (PVDC), polybutylene, ethylene-propylene copolymers, polycarbonates (PC), polystyrene (PS), styrene copolymers, high impact polystyrene (HIPS), acrylonitrile-butadiene-styrene polymers (ABS), acrylonitrile copolymers (AN), polyester, polyamide (Nylon), polylactic acid (PLA) and regenerated cellulose films (Cellophane).

One or both surfaces of the polymer film may be treated or coated, if so desired. For example, a polymer film may be metallized by depositing a thin metal vapor such as aluminum onto the film's surface. Metallization may enhance the barrier properties of the finished laminate. The polymer film surface may also be coated with anti-fog additive or the like or subjected to a pretreatment with electrical or corona discharges, or ozone or other chemical agents to increase its adhesive receptivity. A coating of an inorganic oxide such as SiOx or AlOx may also be present on the polymer surface (for example, an SiOx- or AlOx-coated PET film).

One or more layers of the laminate may also comprise a metal film or foil, such as aluminum foil or the like. The metal foil will preferably have a thickness of about 5 to 100 µm.

The individual films comprising the laminate can be prepared in widely varying thicknesses, for example, from about 5 to about 200 microns. The films, foils, and laminating adhesive formulation can be assembled into the laminate by using any one or more of the several conventional procedures known in the art for such purpose. For instance, the adhesive formulation may be applied to the surface of one or both of two films/foils by means of extrusion, brushes, rollers, blades, spraying or the like and the film/foil surfaces bearing the adhesive composition brought together and passed through a set of rollers (often referred to as nip rollers) which press together the film/foils having the adhesive composition between the films/foils. The resulting laminate may be rolled or wound onto a reel to allow the adhesive to fully cure before further processing. The adhesive may be applied by conventional techniques; e.g., by a multi-roll application station.

One typical method for applying the adhesive composition to a substrate such as a film or foil is through the use of a series of smooth surface rubber and steel transfer rollers on a solventless adhesive laminator. The components of the adhesive are mixed using Meter/Mix/Dispense (MMD) equipment capable of automatically measuring and mixing the correct amounts of the components and delivering the resulting mixture to the laminator. The mixed adhesive is deposited on the first two rollers and metered by the remaining rollers in the application station (typically, 3 to 5 rollers). The flow characteristics of the adhesive composition may be improved by heating the first two rollers to a temperature of from about 35 to about 60° C. Typically, the final application roller is heated to a temperature of from about 40 to about 60° C. Modifications of these temperatures may be required depending upon line speed, substrates and roller size.

The coating weight at which the adhesive formulation can be applied to the surface of a film layer is in the range of about 0.12 to about 3.1 lbs./ream. ft., and more typically about 0.8 to about 1.4 lbs./ream sq. ft. for solvent free laminations, and 1.2-3.5 lbs./ream for solvent based adhesive laminations.

A second film or foil substrate is pressed against the substrate having the adhesive applied thereon by means of one or more nip rollers. Nip temperatures may be adjusted as needed depending upon line speed, thickness of the laminate, reactivity and other characteristics of the adhesive, and the substrates being laminated, but temperatures of from about 45 to about 90° C. are typically suitable.

It may be desirable to heat the laminate at an elevated temperature (e.g., about 40° C. to about 100° C.) so as to accelerate full curing of the adhesive composition. Alternatively, the adhesive composition can be curable at approximately room temperature (e.g., about 20° C. to about 25° C.) or higher over a period of from about 1 to about 14 days.

Generally speaking, the disclosed adhesive compositions are believed to be largely chemically cured through the reaction of the formulation constituents containing isocyanate groups and the constituents containing hydroxyl or other active hydrogen groups. However, partial curing is also possible through reaction of the isocyanate groups in Component A with moisture inherently present on the film or foil surfaces. Curing only by reaction of the isocyanate groups in Component A with moisture is undesirable and should be avoided.

Laminates prepared in accordance with the present disclosure may be used for packaging purposes in the same manner as conventional or known flexible laminated packaging films. The laminates are particularly suitable for forming into flexible pouch-shaped container vessels capable of being filed with a foodstuff and sealed. For example, two rectangular or square sheets of the laminate may be overlaid in the desired configuration or arrangement; preferably, the two layers of the two sheets which face each other are capable of being heat-sealed to each other. Three peripheral portions of the overlaid assembly are then heat-sealed to form the pouch. Heat-sealing can easily be accomplished by means of a heating bar, heating knife, heating wire, impulse sealer, ultrasonic sealer, or induction heating sealer. One peripheral portion remains open to allow filling of the pouch with product.

The foodstuff is thereafter packed in the so-formed pouch through the open peripheral portion. If necessary, gasses injurious to the foodstuff such as air are removed by known means such as vacuum degasification, hot packing, boiling degasification, or steam jetting or vessel deformation. The pouch opening is then sealed using heat. The packed pouch may be heated at a later time.

Adhesives used for bonding films into flexible packaging must have a number of properties to be commercially useful.

These properties will change depending on the use for which the flexible packaging is designed. Cured reaction products of the adhesive must have little or no migration from the packaging into the packaged product. Cured reaction products of the laminating adhesive must have minimum room temperature bond strengths to common laminating film materials of 200 to 300 grams/inch for a low stress application. Cured reaction products of the laminating adhesive must have minimum room temperature bond strengths to common laminating film materials of 400 grams/inch or more for a higher stress application. The most preferred result is for the cured reaction products of the laminating adhesive top have sufficient room temperature bond strength to common laminating film materials so that the laminating film fails before the adhesive. Cured reaction products of the laminating adhesive must retain most of this room temperature bond strength to common laminating film materials after exposure to the packaged food product. For some applications the cured reaction products of the laminating adhesive must retain most of this bond strength after exposure to elevated temperatures.

EXAMPLES

The following materials were used in the examples.

DEG diethylene glycol.

PLA polylactic acid polymer Mn 85000 daltons available as 3052D from Natureworks LLC.

Titanium (IV) Butoxide catalyst available as Tyzor TPT from Dorf Ketal.

Castor oil available from T 31 oil from Eagle Specialty Products.

Fuller P-A is an isocyanate functional material available from H.B. Fuller.

Liofol LA 3817, a solvent based isocyanate functional material comprising 80 wt. % solids in ethyl acetate solvent having a % NCO of about 2.8%, available from Henkel Corporation.

Liofol LA 7660, an isocyanate functional material having a % NCO of about 16%, available from Henkel Corporation.

Liofol LA 7773, an isocyanate functional material having a % NCO of about 16%, available from Henkel Corporation.

Polyethylene terephthalate (PET GP) is a typical 48 ga polyester film used for outer layers of food packaging laminations. It can function as support for less robust films, such as aluminum foil. It is often printed on the side facing the interior of the package.

PET Met is 48-gauge polyester with a very thin layer of aluminum, via vacuum vapor deposition PET-Foil is 48-gauge polyester laminated to 0.0035 ga aluminum foil with a solvent based commercial adhesive RLS OPP is an oriented polypropylene film of about 75 gauge.

High Slip PE is a polyethylene film containing about 1000 ppm of a slip agent such as erucamide to facilitate handling properties. Different thicknesses commonly used in the market (1 mil and 2 mil) were included.

Low density polyethylene (LDPE) is a homopolymer of ethylene having a density of about 0.910 to about 0.925 grams/cm$^3$.

Laminate combination 1 is PET GP(48 ga)/adhesive/High Slip PE(2 mil) 1000 ppm.

Laminate combination 2 is PET GP(48 ga)/adhesive/LDPE(1 mil).

Laminate combination 3 is PET Met(48 ga)/adhesive/High Slip PE(2 mil) 1000 ppm.

Laminate combination 4 is RLS OPP(75 ga)/adhesive/RLS OPP(75 ga).

Laminate combination 5 is PET-Foil/adhesive/High Slip PE(2 mil) 1000 ppm.

Laminations were prepared using a Nordmeccanica Labo Combi to coat each of the prepared adhesives at a coating weight of about at 1.2 lbs./ream.

Viscosity was measured using a Brookfield viscosimeter at 25° C.

Bond strength was tested by preparing a flexible packaging laminate material and allowing that material to cure for a desired time. One inch by 4 inch to 6 inch sample is cut from the pouch and tested for bond strength via a tensile strength tester at room temperature or a desired elevated temperature with failure mode noted. This is a T peel test with the laminated tail held at 90 degrees to the ends being pulled.

Heat seal bond strength was tested according to ASTM F88 Seal Strength of Flexible Barrier Materials. Generally, a laminated sample is cut into specimens one inch wide by approximately 6-8 inches long. The specimen is folded so that the sealant film is on the inside and the total folded length is 3-4 inches. Form a heat seal in the folded material. Using a tensile tester with a 100 lb. load cell and clamp each leg of the test specimen in the tensile testing machine. Center the specimen laterally in the grips. Align the specimen in the grips so the seal line is perpendicular to the direction of pull. Test the heat seal at a rate grip separation of 8-12 inches/min. Test the material to failure and noter the force (strength) values and mode of specimen failure.

Product resistance was tested by preparing a flexible packaging laminate material and allowing that material to cure for a desired time. 4 inch by 4 inch pouches were prepared from the cured laminate and about 30 ml of a test food product (2 gm for the coffee and flavoured coffee samples) was sealed within. The sealed pouch is aged for 100 hours at 60° C. At the end of the aging period a 1 inch by 4 inch to 6 inch sample of a bond area is cut from the pouch and tested for bond strength with failure mode noted. Test food products include water, ketchup, mayonnaise, vegetable oil, 1-1-1 sauce (a 1 to 1 to 1 mixture of ketchup, vinegar and vegetable oil), non-flavoured coffee and hazelnut flavoured coffee.

Failure modes and their abbreviations are:

Elongation—E; when one or both of the substrates elongates during the test.

SF—Stock Fail; one or both laminating films fail.

P—Peel; when the laminate is allowed to separate the entire length of the test strip without either of the two substrates tearing or breaking.

SS—Stock Split; when either of the two substrates fails after the first inch of the test strip MT—Metal Transfer; the metallized layer pulls off of the originally metalized film and remains bonded to the other film.

Z—Zipper; when the failure has an alternating high strength, low strength, high strength, low strength mode P-MT—Peel and Metal Transfer;

P/E-N—Peel and Elongation Neck;

P/E/N—SS-Peel and Elongation Neck and Stock Split)

P/Z—Peel and Zipper

| 2K adhesive combinations | | |
|---|---|---|
| adhesive | NCO component A | OH component B |
| Ad1 | LA 7773 (A1) | 80% sample 1 + 20% sample 3 (B1) |
| Ad2 | LA 3817 (A2) | 80% sample1 + 20% sample3 (B1) |
| Ad3 | LA 7660 (A3) | 100% sample1 (B2) |
| Ad4 | LA 7660 (A3) | 80% sample1 + 20% sample3 (B1) |

-continued

| 2K adhesive combinations | | |
|---|---|---|
| adhesive | NCO component A | OH component B |
| Ad5 | LA 7773 (A1) | 100% sample1 (B2) |
| Ad6 | LA 7773 (A1) | 80% sample2 + 20% sample3 (B3) |
| comparative | P-A | PC-1 |

Preparation of Transesterified Polyester Polyol Product 1:

A round bottom flask was equipped with thermometer, mechanical stirrer, reflux condenser and nitrogen inlet. The flask was charged with 104 g of diethylene glycol (DEG) and 555 g of high molecular weight PLA polymer. Titanium (IV) butoxide was first dissolved in isopropanol as 0.1 g/mL, then 2 mL of this titanium (IV) butoxide solution was added into the flask. The reaction was heated to 150 to 165° C. with stirring. When complete melting of the mixture occurred, 155 g castor oil was added into the flask and the temperatures was increased to 170 to 180° C. and held for 3 hours. The mixture temperature was increased to 190 to 200° C. and held for 4 hours. The mixture temperature was further increased to 210 to 220° C. and held there for 7 hours or until a clear homogeneous mixture was obtained.

Heating was terminated and the transesterified reaction product was discharged when the temperature decreased to 50° C. This is sample 1.

Sample 1 is a transesterified polyester polyol reaction product having a number average molecular weight of about 935 g/mol, an OH number is 125 mgKOH/g, a viscosity of 14500 cps at 25° C. and a weight per gallon is 9.75 lbs/gallon.

Preparation of Transesterified Polyester Polyol Product 2:

A round bottom flask was equipped with thermometer, mechanical stirrer, reflux condenser and nitrogen inlet. The flask was charged with 156 g of dipropylene glycol (DPG) and 509 g of high molecular weight PLA polymer. Titanium (IV) butoxide was first dissolved in isopropanol as 0.1 g/mL, then 2 mL of this titanium (IV) butoxide solution was added into the flask. The reaction was heated to 150 to 165° C. with stirring. When complete melting of the mixture occurred, 134 g soybean oil was added into the flask and the temperatures was increased to 170 to 180° C. and held for 3 hours. The mixture temperature was increased to 190 to 200° C. and held for 4 hours. The mixture temperature was further increased to 210 to 220° C. and held there for 7 hours or until a clear homogeneous mixture was obtained. Heating was terminated and the transesterified reaction product was discharged when the temperature decreased to 50° C. This is sample 2.

Sample 2 is a transesterified polyester polyol reaction product having a number average molecular weight of about 772 g/mol, an OH number is 127 mg KOH/g, a viscosity of 6200 cps at 25° C.

Preparation of High OH Functionality Polyether Polyol Product 3:

Polypropylene glycol (1025 number average molecular weight; 2 equivalents, based on hydroxyl; 72% by wt. of total reaction mixture) was reacted alone with adipic acid (4 equivalents, based on carboxyl; 27% by wt. of total reaction mixture) at 238° C. The reaction mixture was cooled to 160° C. and glycerol (6 equivalents, based on hydroxyl; 13% by wt. of total reaction mixture) was then added and reacted at 230° C. The reaction product was then dried. This is sample 3.

Sample 3 is a high OH functionality polyether polyol product having a functionality of 2-4, an OH number of about 150; an equivalent weight (based on hydroxyl) of 355; a viscosity of about 5,000 cps at 25 degrees C. Sample 3 was stable and did not separate. Sample 3 has at least about two primary hydroxyl groups and at least about two secondary hydroxyl groups.

Preparation of Two Component (2K) Solvent Free Laminating Adhesive Ad1:

Loctite Liofol LA 7773 was used as the isocyanate functional component A1. 80 wt. % of transesterified polyester polyol sample 1 and 20 wt. % high functionality polyether polyol sample 3 were homogeneously mixed. This was polyol component B1.

Component A1 and Component B1 were mixed at a ratio of 1.4 parts component A1 to 1 part component B1 (for an NCO/OH equivalents ratio of 1.4/1) to form curable mixed lamination adhesive Ad1. Flexible laminates were prepared using a number of substrates and the curable mixed lamination adhesive at an application temperature of 45° C., a coating weight of 1.2 lbs/ream, and a nip temperature of 60° C. Bond strength and product resistance of the prepared laminates were tested with results shown in the following table.

| | | bond strength for solvent free adhesive Ad1 | | | | | |
|---|---|---|---|---|---|---|---|
| sample | lami-nate | room temp bonds | | heated (158° F.) bond | | heat seal strength | |
| | | 24 Hr. | 21 Day | 24 Hr. | 21 Day | 24 Hr. | 21 Day |
| Ad1-1 | 1 | 714 (SF) | 705 (SF) | 599 (P) | 763 (SF) | 3559 (SF) | 8183 (SF) |
| Ad1-2 | 2 | 637 (P/E-N) | 497 (SF) | 394 (SS) | 443 (SF) | 2090 (SF) | 6093 (SF) |
| Ad1-3 | 3 | 381 (P-MT) | 426 (P-MT) | 172 (P-MT) | 371 (P-MT) | 3328 (SS) | 4552 (SF) |
| Ad1-4 | 4 | 614 (SF) | 511 (SF) | 237 (SS) | 242 (P) | N/A | N/A |
| Ad1-5 | 5 | 1018 (SS) | 931 (SF) | 785 (SS) | 690 (SF) | 6224 (SF) | 7876 (SF) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

All of the adhesives and laminates had strength suitable for a wide variety of packaging uses.

Product resistance was tested using pouches made from samples of laminate Ad1-1 that had been cured for 9 and 17 days. Results are shown in the following table.

| product resistance for adhesive Ad1 and laminate Ad1-1 | | | | | | | |
|---|---|---|---|---|---|---|---|
| cure time (days) | Water | Ketchup | Mayonnaise | Vegetable Oil | 1-1-1 Sauce | Regular Coffee | Hazelnut coffee |
| 9 | 469 (SF) | 436 (SF) | 385 (SF) | 458 (SF) | 484 (SF) | 318 (SF) | 25 (P) |
| 17 | 347 (SF) | 462 (SF) | 455 (SF) | 542 (SF) | 430 (SF) | 253 (SF) | 318 (P) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

The adhesive and laminate had strength suitable for a wide variety of packaging uses. Product resistance for hazelnut flavoured coffee (a very severe test medium) had mixed results, 318 g peel from a 17-day cure laminate, and 25 g peel from a 9-day cure laminate.

Preparation of Two Component (2K) Solvent Based Laminating Adhesive Ad2:

Loctite Liofol LA 3817 was used as the isocyanate functional component A2.

80 wt. % of transesterified polyester polyol sample 1 and 20 wt. % high functionality polyether polyol sample 3 were homogeneously mixed. This was polyol component B1.

Component A2 and Component B1 were mixed at a ratio of 53 parts component A1 to 10 parts of component B1 (for an NCO/OH equivalents ratio of 1.4/1) to form curable mixed lamination adhesive Ad2. Flexible laminates were prepared using a number of substrates and the curable mixed lamination adhesive at an application temperature of 45° C., a coating weight of 1.5 lbs/ream, and a nip temperature of 60° C. Bond strength and product resistance of the prepared laminates were tested with results shown in the following tables.

bond strength solvent based adhesive Ad2

| sample | laminate | room temp bonds | | heated (158° F.) bond | | heat seal strength | |
|---|---|---|---|---|---|---|---|
| | | 24 Hr. cure | 21 Day cure | 24 Hr. cure | 21 Day cure | 24 Hr. cure | 21 Day cure |
| Ad2-1 | 1 | 573 (SF) | 750 (SF) | 53 (P) | 741 (SS) | 2133 (SS) | 4806 (SF) |
| Ad2-2 | 2 | 932 (SS) | 953 (SF) | 50 (P) | 565 (SF) | 1969 (SS) | 3353 (SF) |
| Ad2-3 | 3 | 425 (P-MT) | 528 (P-MT) | 71 (P) | 209 (P) | 2436 (SS) | 2668 (SF) |
| Ad2-4 | 4 | 846 (SS) | 554 (SF) | 74 (P) | 284 (SS) | N/A | N/A |
| Ad2-5 | 5 | 756 (SS) | 1061 (SF) | 519 (SF) | 780 (SF) | 3144 (SS) | 7447 (SF) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

Adhesive Ad2 maintained bond strength performance when tested at 21 days. All of the adhesives and laminates had strength suitable for a wide variety of packaging uses. Product resistance was tested using pouches made from samples of laminate Ad2-1 that had been cured for 9 and 17 days. Results are shown in the following table.

product resistance for adhesive Ad2 and laminate Ad2-1

| cure time (days) | Water | Ketchup | Mayonnaise | Vegetable Oil | 1-1-1 Sauce | Regular Coffee | Hazelnut coffee |
|---|---|---|---|---|---|---|---|
| 9 | 583 (SF) | 580 (SF) | 416 (SF) | 403 (SF) | 423 (SF) | 547 (SF) | 89 (P) |
| 17 | 563 (SF) | 702 (SF) | 447 (SF) | 658 (SF) | 438 (SF) | 525 (SF) | 300 (SF) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

The adhesive and laminate had strength suitable for a wide variety of packaging uses.

Preparation of Two Component (2K) Solvent Free Laminating Adhesive Ad3:

Loctite Liofol LA 7660 was used as the isocyanate functional component A3.

100 wt. % of transesterified polyester polyol product sample 1 was used as polyol component B2.

Component A3 and Component B2 were mixed at a ratio of 1.4 parts component A3 to 1-part component B2 (for an NCO/OH equivalents ratio of 1.4/1) to form curable mixed lamination adhesive Ad3. Flexible laminates were prepared using laminate combination 1 at an application temperature of 40° C., a coating weight of 1.2 lbs/ream, and a nip temperature of 60° C. Flexible laminates were cured at 20° C. for 16 days.

bond strength solvent free adhesive Ad3

| sample | laminate | room temp bonds | | heated (158° F.) bond | | heat seal strength | |
|---|---|---|---|---|---|---|---|
| | | 48 Hr. | 14 Day cure | 48 Hr. | 14 Day cure | 48 Hr. | 14 Day cure |
| Ad3-1 | 1 | 603 (SS) | 769 (SF) | 461 (SS) | 544 (SF) | 2659 (SF) | 2273 (SF) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

The adhesive and laminate had strength suitable for a wide variety of packaging uses. After 48 hours of cure the bond and heat seal had a desirable failure mode of stock tear of the PET GP(48 ga)/High Slip PE(2 mil) 1000 ppm structure.

Product resistance of the AD3-1 sample was tested after 16 days of cure. Results are shown in the following table.

product resistance of solvent free adhesive Ad3 on laminate Ad3-1

| cure time (days) | Water | Ketchup | Vegetable Oil | 1-1-1 Sauce | Regular Coffee | Hazelnut Coffee |
|---|---|---|---|---|---|---|
| 16 | 6 (P) | 7 (P) | 589 (SS) | 423 (SF) | 8 (P) | 4 (P) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

Product resistance after 16 days of cure is essentially absent, showing this flexible laminate is not suitable for use in food packaging except with vegetable oil. While these laminates are not well suited for food packaging they may be useful for applications where the product is dry or where biodegradability is desired.

Preparation of Two Component (2K) Solvent Free Laminating Adhesive Ad4:

Loctite Liofol LA 7660 was used as the isocyanate functional component A3.

80 wt. % of transesterified polyester polyol sample 1 and 20 wt. % high functionality polyether polyol sample 3 were homogeneously mixed. This was polyol component B1.

Component A3 and Component B1 were mixed at a ratio of 1.4 to 1 (for an NCO/OH equivalents ratio of 1.4/1) to form curable mixed lamination adhesive Ad4. Flexible laminates were prepared using 48 ga PET as the primary web, and laminated to 1000 ppm slip 2 mil PE (laminate combination 1). Lamination was done at an application temperature of 40° C., a coating weight of 1.2 lbs/ream, and a nip temperature of 60° C. The flexible laminate was cured at 20° C. for 16 days.

Room temperature bond strength after 48 hours was tested with results shown in the following table.

| bond strength solvent free adhesive Ad4 | | | | | | |
|---|---|---|---|---|---|---|
| | | room temp bonds | | heated (158° F.) bond | | heat seal strength |
| sample | laminate | 48 Hr. | 14 Day cure | 48 Hr. | 14 Day cure | 48 Hr. | 14 Day cure |
| Ad4-1 | 1 | 837 (SF) | 761 (SF) | 845 (SS) | 665 (SF) | 2732 (SF) | 2591 (SF) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

The adhesive and laminate had strength suitable for a wide variety of packaging uses.

Product resistance of the Ad4-1 sample was tested after 16 days of cure. Results are shown in the following table.

| product resistance of solvent free adhesive Ad4 on laminate Ad4-1 | | | | | | |
|---|---|---|---|---|---|---|
| cure time (days) | Water | Ketchup | Vegetable Oil | 1-1-1 Sauce | Regular Coffee | Hazelnut Coffee |
| 16 | 91 (P) | 290 (SS) | 619 (SS) | 299 (SS) | 108 (P) | 34 (P) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

Product resistance is suitable for some food packaging applications but is not as good (particularly for water and coffee resistance) as the AD1 results.

Preparation of Two Component (2K) Solvent Free Laminating Adhesive Ad5:

Loctite Liofol LA 7773 was used as the isocyanate functional component A1.

A transesterified polyester polyol product made using the same reactants, reactant amounts and process of sample 1 but in a different batch. This is sample 1a. 100 wt. % of transesterified polyester polyol sample 1a was used as polyol component B2a.

Component A1 and Component B2a were mixed at a ratio of 1.4 parts component A1 to 1-part component B2a (for an NCO/OH equivalents ratio of 1.4/1) to form curable mixed lamination adhesive Ad5. Flexible laminates were prepared using laminate combination 1 at an application temperature of 40° C., a coating weight of 1.2 lbs/ream, and a nip temperature of 60° C. Flexible laminates were cured at 20° C. for 14 days. Bond strengths are shown in the following table.

| bond strength solvent based adhesive Ad5 | | | | | | |
|---|---|---|---|---|---|---|
| | | room temp bonds | | heated (158° F.) bond | | heat seal strength |
| sample | laminate | 24 Hr. cure | 14 Day cure | 24 Hr. cure | 14 Day cure | 24 Hr. cure | 14 Day cure |
| Ad5-1 | 1 | 348 (P) | 280 (P) | 412 (P) | 526 (P) | 3467 (SF) | 3466 (SF) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

The adhesive and laminate had strength suitable for a wide variety of packaging uses. For the samples after 24 hours of cure, the heat seal failure mode was stock tear of the PET GP(48 ga)/High Slip PE(2 mil) 1000 ppm structure.

Product resistance of the AD5-1 sample was tested after 16 days of cure. Results are shown in the following table.

| product resistance of solvent free adhesive Ad5 on laminate Ad5-1 | | | | | | |
|---|---|---|---|---|---|---|
| cure time (days) | Water | Ketchup | Vegetable Oil | 1-1-1 Sauce | Regular Coffee | Hazelnut Coffee |
| 16 | 6 (P) | 8 (P) | 316 (SS) | 10 (P) | 12 (P) | 5 (P) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

Product resistance after 16 days of cure is essentially absent, showing this flexible laminate is not suitable for use in food packaging except with vegetable oil. While these laminates are not well suited for food packaging they may be useful for applications where the packaged product is dry or where biodegradability is desired.

Preparation of Two Component (2K) Solvent Free Laminating Adhesive Ad6:

Loctite Liofol LA 7773 was used as the isocyanate functional component A1.

80 wt. % of transesterified polyester polyol product sample 2 and 20 wt. % high functionality polyether polyol product 3 were homogeneously mixed. This was polyol component B3.

Component A1 and Component B3 were mixed at a ratio of 1.4 parts component A1 to 1-part component B3 (for an NCO/OH equivalents ratio of 1.4/1) to form curable mixed lamination adhesive Ad6. Flexible laminates were prepared using laminate combination 1 and the curable mixed lamination adhesive Ad6 at an application temperature of 35° C., a coating weight of 1.2 lbs/ream, and a nip temperature of 60° C. Bond strength and product resistance of the prepared laminates were tested with results shown in the following tables.

bond strength for solvent free adhesive Ad6

| sample | lami-nate | room temp bonds 24 Hr. | room temp bonds 21 Day | heated (158° F.) bond 24 Hr. | heated (158° F.) bond 21 Day | heat seal strength 24 Hr. | heat seal strength 21 Day |
|---|---|---|---|---|---|---|---|
| Ad6-1 | 1 | 1152 (SF) | 1155 (SF) | 689 (P) | 863 (SF) | 5222 (SF) | 7803 (SF) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

The adhesive and laminate had strength suitable for a wide variety of packaging uses.
Product resistance was tested using pouches made from samples of laminate Ad6-1, that had been cured for 9 and 16 days. Results are shown in the following table.

product resistance for adhesive Ad6 and laminate Ad6-1

| cure time (days) | Water | Ketchup | Mayonnaise | Vegetable Oil | 1-1-1 Sauce | Regular Coffee | Hazelnut coffee |
|---|---|---|---|---|---|---|---|
| 9 | 275 (P) | 363 (SS) | 437 (SF) | 577 (SF) | 401 (SF) | 326 (P) | 323 (P) |
| 16 | 489 (SS) | 467 (SF) | 397 (SF) | 388 (SF) | 401 (SF) | 455 (SS) | 386 (SS) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

Adhesive Ad6 maintained bond strength when tested with various food products and was suitable for a wide range or food packaging applications.

Preparation of a Comparative Polyol Component PC-1 Comprising Natural Oils:

Comparative Polyol Component 1 (PC-1) was prepared as described for Polyol Component 1 in U.S. Patent Publication 2017/0002240 to Ostlund et al.

OH numbers, acid numbers and viscosities for sample 1a, sample 2 and PC-1 were tested and results are listed below.

| Sample | OH number (mg KOH/g) | Acid number (mg KOH/g) | Viscosity (Brookfield at 25° C., cps) |
|---|---|---|---|
| sample 1a | 126 | 18.8 | 6200 |
| sample 2 | 136 | 16.5 | 5000 |
| Comparative PC-1 | 108 | 7.3 | 33750 |

Samples of 1a, 2 and PC-1 were compared via GPC. FIG. 1 is a normalized GPC chromatogram (RI detector) for these Samples. Data for these GPC analyses is also shown in the below Table.

| | Retention Time | Mn | Mw | MP | Mz | Polydispersity |
|---|---|---|---|---|---|---|
| PC130 | 26.95 | 708 | 1232 | 1222 | 1917 | 1.7 |
| PSP130 | 27.37 | 684 | 977 | 982 | 1348 | 1.4 |
| PC-1 | 27.31 | 1183 | 1304 | 1163 | 1439 | 1.1 |

As shown in the above Table and FIG. 1 GPC, molecular weights of the three PLA polyols are in the range of 1000 to 1500 g/mol. Samples 1a and 2 are more amorphous in character than the PC-1. Samples 1a and 2 have an extra amount of lower molecular weight oligomers compared to PC-1, which make samples 1a and 2 less viscous and easier to process in the laminating process.

Preparation of Comparative Two Component (2K) Solvent Free Laminating Adhesive AdPC-1.

Commercially available Fuller P-A, an isocyanate functional component, was combined with comparative Polyol Component 1 PC-1 at a ratio of 8 parts by weight Fuller P-A to 10 parts by weight PC-1 for an NCO/OH equivalents ratio of 1.25/1 to form a comparative adhesive AdPC-1. Laminations were prepared using a coating weight of 1.2 lbs./ream, an application temperature of 45° C. and a nip temperature of 60° C. on laminate combination 1 (PET GP/adhesive/High Slip PE). Adhesive was applied to the PET GP film and the High Slip PE film was laminated to this. This is comparative sample PC-1-1.

The comparative laminated samples were cured at room temperature after which time the samples were tested.

bond strength for adhesives Ad1, Ad6 and ADPC-1 on laminates AD1-1, AD6-1 and AdPC-1-1

| sample | lami-nate | room temp bonds 24 Hr. cure | room temp bonds 21 Day cure | heated (158° F.) bond 24 Hr. cure | heated (158° F.) bond 21 Day cure | heat seal strength 24 Hr. cure | heat seal strength 21 Day cure |
|---|---|---|---|---|---|---|---|
| Ad1-1 | 1 | 714 (SF) | 705 (SF) | 599 (P) | 763 (SF) | 3559 (SF) | 8183 (SF) |
| Ad6-1 | 1 | 1152 (SF) | 1155 (SF) | 689 (P) | 863 (SF) | 5222 (SF) | 7803 (SF) |
| AdPC-1-1 | 1 | 25 (P/Z) | 26 (P/Z) | 11 (P) | 196 (P) | 3053 (SF) | 3211 (SF) |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

The Ad1-1 and Ad6-1 adhesive and laminate had strength suitable for a wide variety of packaging uses. The comparative AdPC-1-1 adhesive and laminate had room temperature and elevated bond strengths that were not suitable for any food packaging application.

Product resistance was tested using pouches made from samples of laminates Ad1-1, Ad6-1 and AdPC-1-1 that had been cured for 15 days (AdPC-1-1); 16 days (Ad6-1) or 17 days (Ad1-1). Results are shown in the following table.

| product resistance for the comparative adhesive and comparative laminate PC-1-1 comparison to Ad1-1 and Ad6-1 | | | | | | | |
|---|---|---|---|---|---|---|---|
| Sample | Water | Ketchup | Mayonnaise | Vegetable Oil | 1-1-1 Sauce | Regular Coffee | Hazelnut coffee |
| Ad 1-1 | 347 (SF) | 462 (SF) | 455 (SF) | 542 (SF) | 430 (SF) | 253 (SF) | 318 (P) |
| Ad6-1 | 489 (SS) | 467 (SF) | 397 (SF) | 388 (SF) | 401 (SF) | 455 (SS) | 386 (SS) |
| AdPC-1-1 | 0 | 40 (P) | 0 | 14 (P) | 14 (P) | 0 | 0 |

(Failure mode abbreviation: SF—Stock Fail; P—Peel; SS—Stock Split; P-MT—Peel-Metal Transfer; P/E-N—Pell Elongation Neck; P/E/N-SS—Peel Elongation Neck-Stock Split)

Laminate samples Ad1-1 and Ad6-1, (comprising cured reaction products of adhesives Ad1 and Ad6 respectively) had both high strength and product resistance and are well suited for use as adhesives in laminating materials for food and other products.

Samples Ad1, Ad2 Ad4 and Ad6, comprising the high OH functionality polyol product, had surprisingly higher room temperature strength, elevated temperature strength and product resistance compared to samples Ad3 and Ad5 without the high OH functionality polyol product. Use of a combination of transesterified reaction product and high OH functionality polyol product is especially desirable where one or more of these properties is desired.

Comparative sample AdPC-1-1 comprising cured reaction products of a comparative adhesive based on PA and PC-1 had low bond strength and very poor product resistance. Neither comparative sample AdPC-1-1 nor the comparative adhesive AdPC-1 would be suitable for use as adhesives in laminating materials for food and other products.

What is claimed is:

1. An isocyanate reactive component for reaction with an isocyanate functionalized component to form a two-component laminating adhesive, comprising:
   a transesterification product of a reaction mixture comprising polymeric polylactic acid and at least one natural oil; and
   a high OH functionality polyol product
   and wherein the reaction mixture comprises: polylactic acid present in an amount of from 50 to 85 weight percent based on a total weight of the reaction mixture; at least one natural oil present in an amount of from 13 to 30 weight percent based on the total weight of the reaction mixture; a diol present in an amount of from 2 to 36 weight percent based on the total weight of the reaction mixture; and optionally, a transesterification catalyst.

2. The isocyanate reactive component of claim 1 wherein the reaction mixture comprises polymeric polylactic acid, at least one natural oil and a diol having a molecular weight of about 50 to about 2000 daltons.

3. The isocyanate reactive component of claim 1 having a renewable content in the range of at least 70%.

4. The isocyanate reactive component of claim 1 having a viscosity of 3,000 to 20,000 cps at 25° C.

5. The isocyanate reactive component of any of claim 1 wherein the high OH functionality polyol product has at least about two primary hydroxyl groups and at least about two secondary hydroxyl groups.

6. The isocyanate reactive component of claim 1 wherein the natural oil is castor oil and/or soybean oil.

7. A two-component adhesive for laminating flexible packaging material including a Component A and a Component B, wherein:
   Component A comprises an isocyanate functionalized compound having two or more terminal isocyanate groups per molecule; and
   Component B comprises the isocyanate reactive component including a transesterification product of a reaction mixture comprising polymeric polylactic acid and at least one natural oil; and a high OH functionality polyol product.

8. The two-component adhesive of claim 7 wherein the isocyanate functionalized compound is prepared using one or more polyisocyanates.

9. The two-component adhesive of claim 7 wherein the isocyanate functionalized compound is prepared using diphenylmethane diisocyanate, a modified version of diphenylmethane diisocyanate and combinations thereof.

10. The two-component adhesive of claim 7 wherein the isocyanate functionalized compound comprises a polyurethane prepolymer reaction product of at least one polyol and an excess of a polyisocyanate.

11. Cured reaction products of the two-component adhesive claim 7.

12. Cured reaction products of the two-component adhesive of claim 7 having a minimum room temperature bond strength of 200 grams/inch.

13. Cured reaction products of the two-component adhesive of claim 7 having a minimum room temperature bond strength of 400 grams/inch.

14. A flexible laminate comprising the two-component adhesive of claim 7 disposed between a first film surface and a second film surface.

15. A flexible laminate comprising cured reaction products of the two-component adhesive of claim 7 disposed between a first film surface and a second film surface.

16. A food container comprising a food product disposed between layers of flexible laminate, the flexible laminate comprising cured reaction products of the two-component adhesive of claim 7 bonding adjacent films.

* * * * *